United States Patent
van Boxtel

(10) Patent No.: US 12,441,166 B2
(45) Date of Patent: Oct. 14, 2025

(54) ROOF SYSTEM

(71) Applicant: INALFA ROOF SYSTEMS GROUP B.V., Oostrum (NL)

(72) Inventor: Eduardus Christianus van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 403 days.

(21) Appl. No.: 18/123,065

(22) Filed: Mar. 17, 2023

(65) Prior Publication Data
US 2023/0302884 A1    Sep. 28, 2023

(30) Foreign Application Priority Data
Mar. 22, 2022    (CN) .......................... 202210284352.9

(51) Int. Cl.
*B60J 7/00*    (2006.01)
*B60J 3/00*    (2006.01)
(Continued)

(52) U.S. Cl.
CPC ........... *B60J 7/0015* (2013.01); *B60J 7/0084* (2013.01); *E05D 15/0621* (2013.01);
(Continued)

(58) Field of Classification Search
CPC ............................. B60J 7/0015; B60J 7/0084
(Continued)

(56) References Cited

U.S. PATENT DOCUMENTS 5,306,069 A * 4/1994 Becker ....................... B60J 7/22
                                                     296/222
8,727,430 B2 * 5/2014 Schroferl ............... B60J 7/0084
                                                     296/213
(Continued)

FOREIGN PATENT DOCUMENTS

CN    109910578 A  *  6/2019  ............. B60J 7/0084
DE    3824942 C1   * 10/1989  ................ B60J 7/05
(Continued)

OTHER PUBLICATIONS

CN1099105 78 Text (Year: 2019).*
(Continued)

*Primary Examiner* — Dennis H Pedder
(74) *Attorney, Agent, or Firm* — Steven M. Koehler; Westman, Champlin & Koehler, P.A.

(57) ABSTRACT

A vehicle roof system comprises a stationary part configured to be attached to a fixed roof and guide rails extending in longitudinal direction substantially parallel to opposite sides of a roof opening. A semi-transparent panel closes the roof opening and has a drain channel for draining water seeping past at least one edge of the panel. A rollo assembly includes a rollo cloth having a first edge connected to a winding shaft, and a second opposite edge to which a beam is connected and opposite lateral edges guided in the guide rails. The cloth is wound onto the winding shaft and wound off to uncover or cover the panel at least partly from below. At least a part of the channel extends transversely within the path of the cloth and comprises a first sliding surface in contact with the cloth to guide it when it is wound up or off.

15 Claims, 5 Drawing Sheets

(51) Int. Cl.
    *E05D 15/06* (2006.01)
    *E05F 15/603* (2015.01)
(52) U.S. Cl.
    CPC ....... *E05F 15/603* (2015.01); *E05Y 2201/434* (2013.01); *E05Y 2201/654* (2013.01); *E05Y 2201/684* (2013.01); *E05Y 2800/428* (2013.01); *E05Y 2900/542* (2013.01)
(58) Field of Classification Search
    USPC .................................................. 296/213, 214
    See application file for complete search history.

(56) References Cited

U.S. PATENT DOCUMENTS

| | | | | |
|---|---|---|---|---|
| 10,173,503 | B2* | 1/2019 | Ten-Jet-Foei | .......... B60J 1/2075 |
| 10,202,025 | B2* | 2/2019 | Bott | ...................... B60J 7/0015 |
| 2008/0136219 | A1* | 6/2008 | Berryhill | .................. B60J 10/82 |
| | | | | 296/213 |
| 2009/0108635 | A1 | 4/2009 | Wingen | |
| 2016/0009165 | A1* | 1/2016 | Sawada | .................. B60J 7/0015 |
| | | | | 296/98 |
| 2021/0213809 | A1 | 7/2021 | Inzerillo et al. | |

FOREIGN PATENT DOCUMENTS

| | | | |
|---|---|---|---|
| DE | 102005030843 | B4 | 8/2009 |
| FR | 2988767 | A1 | 10/2013 |

OTHER PUBLICATIONS

DE3824942 Text (Year: 1989).*
Search Report in corresponding European patent application No. 23162210.1 dated Aug. 24, 2023.

* cited by examiner

ROOF SYSTEM

BACKGROUND

The discussion below is merely provided for general background information and is not intended to be used as an aid in determining the scope of the claimed subject matter.

Aspects of the invention relate to a roof system for a vehicle having a roof opening in its fixed roof and a panel for closing the roof opening.

Such roof system is known in many variations. The panel of such roof system may be fixed or may be movable to open or close the roof opening. The panel and/or the fixed roof has a seal in order to seal the gap between the panel edges and the circumference of the roof opening in the fixed roof. In order to catch and drain any water seeping past the gap to a position outside the vehicle there is a drain system including a drain channel below at least one of the panel edges.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system for a vehicle having a roof opening in its fixed roof, comprises a stationary part configured to be attached to the fixed roof and guide rails extending in longitudinal direction substantially parallel to opposite sides of the roof opening. A semi-transparent panel is supported on the stationary part and is configured to close the roof opening at least partly. The panel has a drain channel connected therewith for draining any water seeping past at least one edge of the panel. A rollo assembly includes a rollo cloth having a first edge with which the cloth is connected to a winding shaft, and a second opposite edge to which a rollo beam is connected and opposite lateral edges guided in the guide rails. The rollo cloth is capable of being wound up onto the winding shaft and wound off from the winding shaft to uncover or cover the panel at least partly from below.

At least a part of the drain channel extends transversely within the path of the rollo cloth and comprises a first sliding surface in contact with the rollo cloth to guide it when it is wound up or off.

By arranging at least a part of the drain channel transversely within the path of the rollo cloth and by providing the first sliding surface in contact with the rollo cloth to guide it when it is wound up or off, the drain channel is made multi-functional. This reduces the number of parts of the roof system as there is no need for a separate rollo cloth guide. The function of the rollo guide is to bring it at the required, constant height. This is necessary as the position of the rollo cloth on the winding shaft varies during its winding or unwinding movement. The guide may also bring the cloth in a desired cross-sectional shape more or less in line with a cross sectional shape of the vehicle roof.

Preferably, the drain channel itself extends partly within the path of the rollo cloth which also reduces the size of the drain channel.

For example, a bottom part of the drain channel may extend within the path of the rollo cloth and forms the first sliding surface.

In one embodiment, the panel is fixed and is positioned within the roof opening.

In such embodiment it is easy to integrate the sliding surface with the drain channel without hindering the movements of the panel, especially when the drain channel is directly fixed to the panel.

In such embodiment, the drain channel may be fixed to a lower side of the panel, e.g., by means of glue and/or encapsulation material.

In such case, the drain channel may also function as a reinforcement for the panel.

Preferably, the drain channel guides the rollo cloth from above, and the drain channel or panel may be provided with a second sliding surface which guides the rollo cloth from below at a position further away from the winding shaft than the first sliding surface.

In this embodiment, the second sliding surface will support the rollo cloth from below thereby reducing the risk of sagging, while it is also easier to curve the rollo cloth in a cross section similar to that of the panel.

To further reduce the number of parts, the drain channel may be provided with an extension which serves as a cover and/or support for the winding shaft of the rollo cloth.

This makes the drain channel even more multi-functional.

The drain channel and its extension may be made from (fiber-reinforced) plastic in order to reduce its weight.

If the extension of the drain channel is configured for attachment to the fixed roof of the vehicle, the tension on the attachment of the drain channel to the panel is reduced.

Especially in such embodiment it is possible that the extension supports a drive motor and drive cables for the rollo beam.

The guide rails may be attached to the stationary part of the roof system but, in a special embodiment, the guide rails are attached to the panel.

The latter further reduces the number of parts as it is not necessary to provide a frame or another stationary part for the guide rails.

The panel may be provided with a fixture configured to support a part of a headliner of the vehicle.

This is particularly useful if there is no frame to which the headliner can be attached.

If the fixed roof and the panel have a slightly curved cross-section it is possible that the rollo shaft is straight and the drain channel is slightly curved with a curvature similar to that of the panel.

If the fixed roof and the panel have a more pronounced curvature, both the rollo shaft and the drain channel may be curved with a curvature similar to that of the panel.

BRIEF DESCRIPTION OF THE DRAWINGS

Aspects of the invention will further be explained with reference to the drawings showing embodiments of the roof system by way of example only.

DETAILED DESCRIPTION OF THE ILLUSTRATIVE EMBODIMENTS

Figure 1:
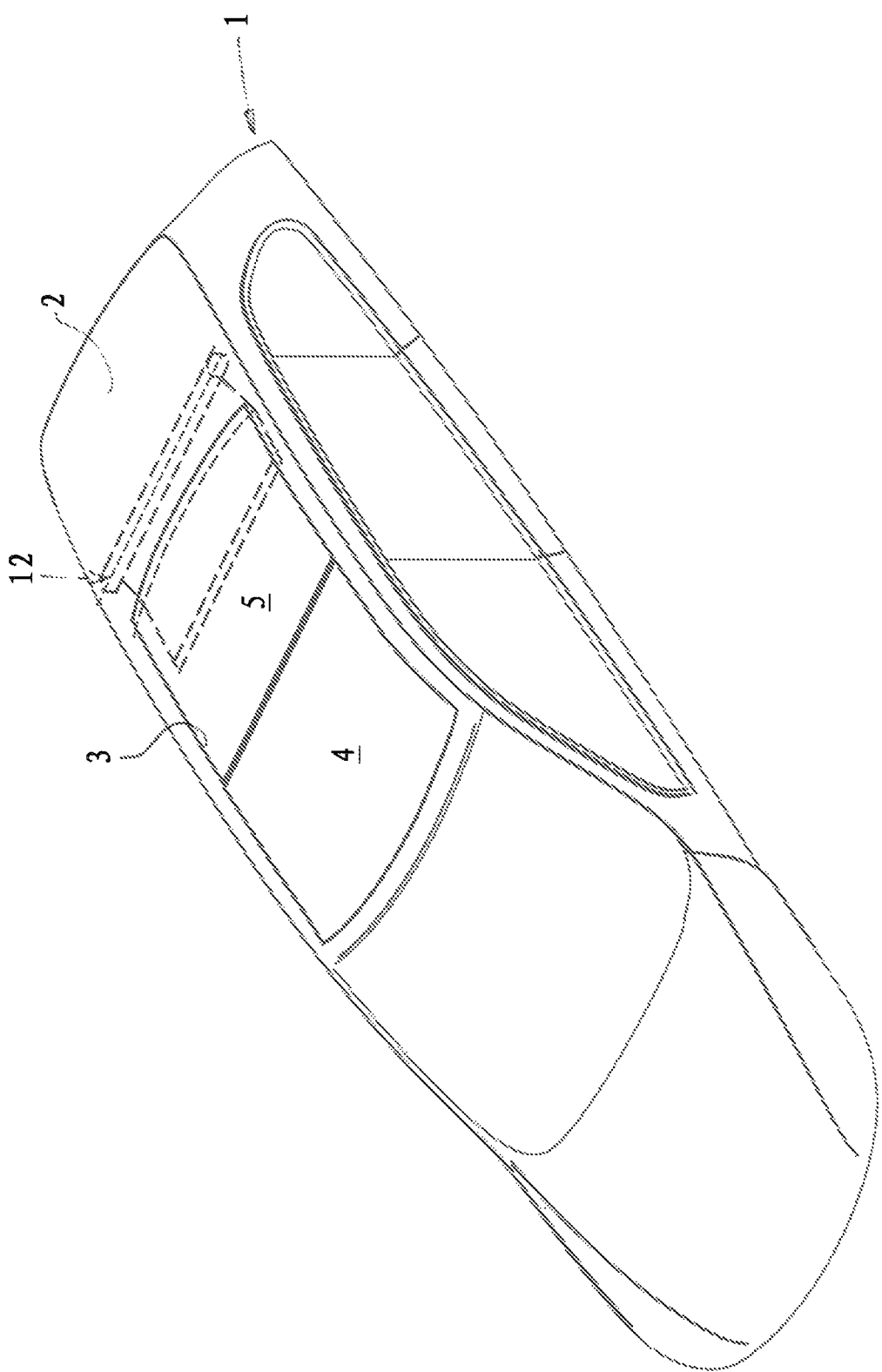
FIG. 1 is a schematic perspective view of a vehicle upper part and fixed roof including the roof system.

First referring to FIG. 1, in a fixed roof 2 of a vehicle 1, such as a passenger car, a roof opening 3 is defined. A roof system is mounted to the fixed such that the roof opening 3 is or may be closed by a single panel 4. However, in the embodiment shown in FIG. 1, the roof opening 3 is closed by a front panel 4 and a rear panel 5. In this case, the front panel 4 is a movable panel which can be moved from a closed position within roof opening 3 (FIG. 1) to an open position (not shown), for example to a position above or below rear panel 5, or just to an upwardly inclined venting position. The panels 4, 5 are at least partly (semi)transparent and are made of glass, plastic, or the like. The panels 4, 5 have four edges with rounded corners. The rear edge of front panel 4 and the front edge of rear panel 5 are sealed against each other, the other edges of panels 4, 5 seal against fixed roof 2. The rear panel 5 in this case is fixed and the invention is illustrated in connection with the rear side of this fixed panel 5, although it could be connected with other sides or edges of either rear panel 5 or front panel 4.

Figure 2:
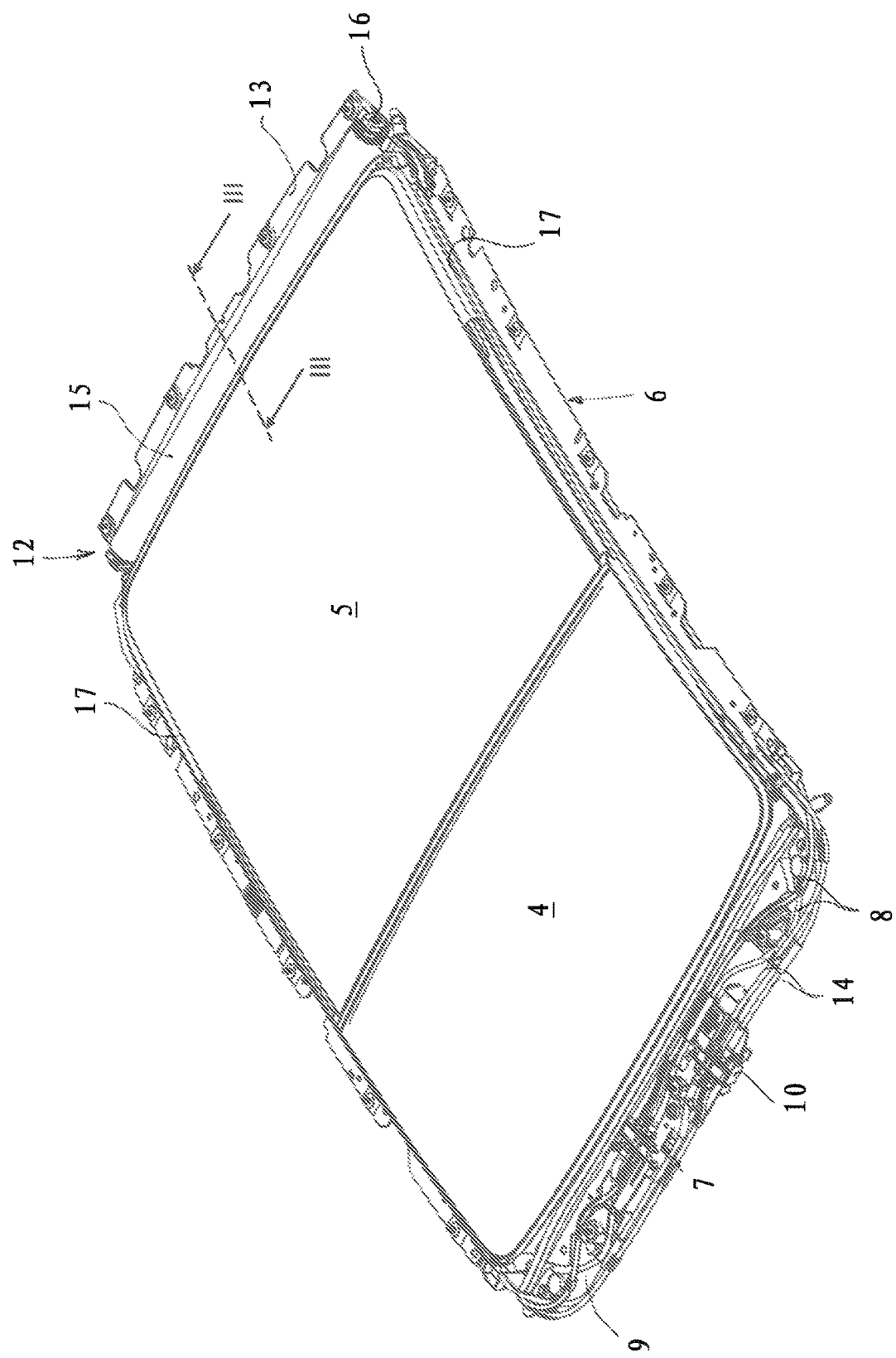
FIG. 2 is an enlarged perspective view of a first embodiment of the roof system.

FIG. 2 shows the roof system before it is built into the vehicle. It shows a stationary part in the form of a frame 6 which supports panels 4 and 5, panel 5 directly and panel 4 through an operating mechanism (not shown, but well known) that is actuated by an electric motor 7 through drive cables 8. Electric motor 7 is arranged on a front transverse beam 9 of frame 6. Front beam 9 carries a second electric motor 10 which is connected to a rollo beam 11 of a rollo system 12 arranged on a rear beam 13 of frame 6. Drive cables 14 connect electric motor 10 to rollo beam 11.

Figure 3:
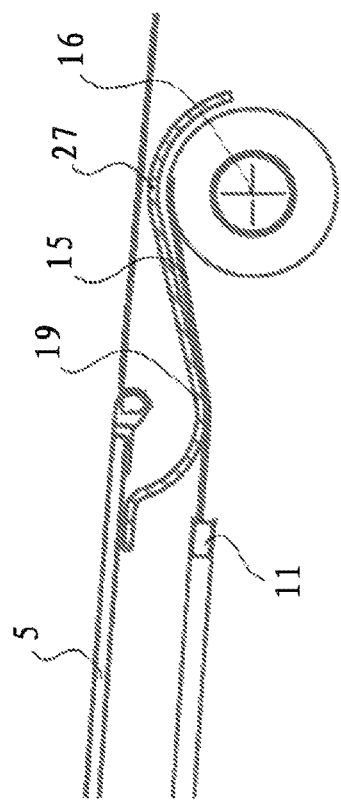
FIG. 3 is an enlarged cross-sectional view according to the line III-III in FIG. 2.

FIG. 3 very schematically shows rollo system 12. It comprises a rollo cloth 15 which is attached on its front side to rollo beam 11 and on its opposite, rear end to a winding shaft 16, such that rollo cloth 15 can be wound on and off winding shaft 16 to move rollo cloth 15 between an open position on winding shaft 16 and a closed position in which it covers at least panel 5 from below and is thus wound off from winding shaft 16. Rollo beam 11 and opposite side edges of rollo cloth 15 are guided in guide rails 17 which extend in longitudinal direction of the roof system along the side edges of roof opening 3. FIGS. 1-3 shows that winding shaft 16 is positioned behind roof opening 3.

FIG. 3 shows that a seal 18 is attached to at least the rear edge of panel 5 but possibly to the complete circumference of panel 5 to seal the gap between the circumferential edges of panel 5 and of roof opening 3. For any (rain) water seeping past seal 18, there is provided a drain channel 19 to catch this water and drain it to a position outside the vehicle. As is shown, this drain channel 19 is attached to the lower side of panel 5 at a position close to the rear edge thereof. In the embodiment shown here, drain channel 19 has a forward lip 20 extending parallel to the lower side of panel 5 and being glued thereto. However, other types of attachment are conceivable such as by encapsulating a part of drain channel 19 by encapsulation material which also adheres to the lower side of panel 5. As drain channel 19 extends substantially the complete length of the rear edge of panel 5, it can also serve as a rear reinforcement of panel 5. Drain channel 19 can be made of (sheet) metal or (fiber-reinforced) plastic or the like.

FIG. 3 further shows that the bottom of the gutter-shaped drain channel 19 extends within the path of rollo cloth 15, such that the lower side of the bottom of drain channel 19 serves as a sliding surface 21 for rollo cloth 15 such that rollo cloth 15 extends forwardly from sliding surface 21 always at the same height. Then rollo cloth 15 leaves winding shaft 16 at different heights depending on the number of windings on winding shaft 16, i.e., depending on the opening and closing stage. By using drain channel 19 for this function, a separate cloth guide can be dispensed with.

Figure 4:
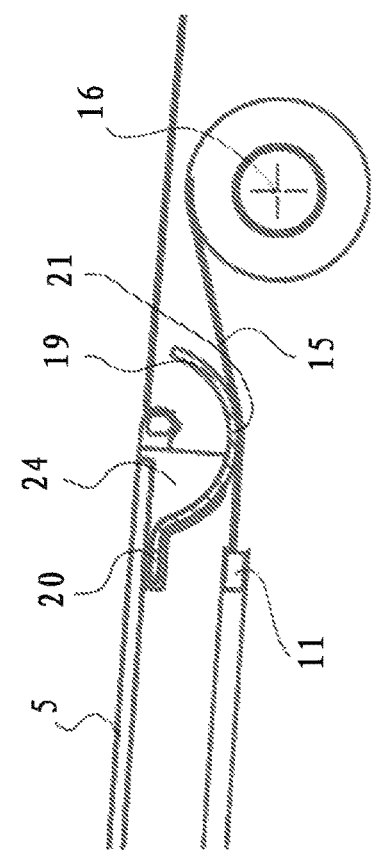
FIG. 4-10 are cross-sectional views corresponding to that of FIG. 3 but showing different embodiments of the roof system, especially of its drain channel.

FIG. 4 shows a second embodiment in which drain channel 19 has an additional guide 22 to form a second sliding surface 23. First sliding surface 21 contacts the upper side of rollo cloth 15, while second sliding surface 23 contacts the lower side thereof at a position further away from winding shaft 16 than first sliding surface 21. Second sliding surface 23 supports rollo cloth 15 from below and therefore prevents sagging thereof without requiring a large tension force on it in longitudinal direction.

Figure 5:
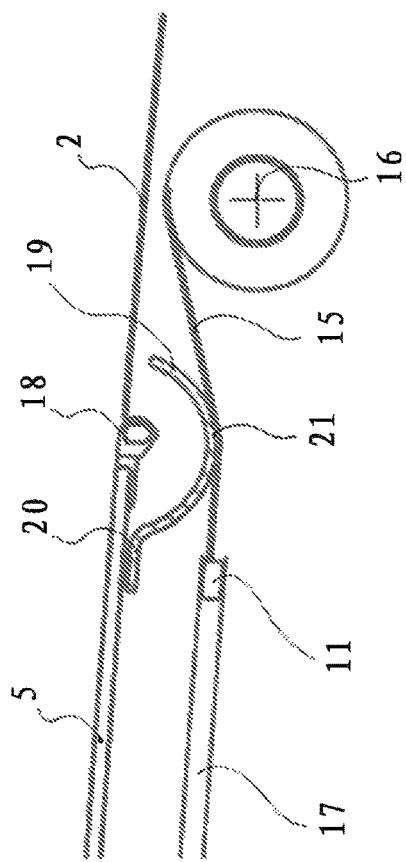

In the embodiment of FIG. 5, drain channel 19 comprises a rearward extension 27 such that drain channel 19 covers winding shaft 16 and possibly is also provided with a suspension for winding shaft 16 so that rear beam 13 of frame 6 is not needed to support winding shaft 16.

Figure 6:
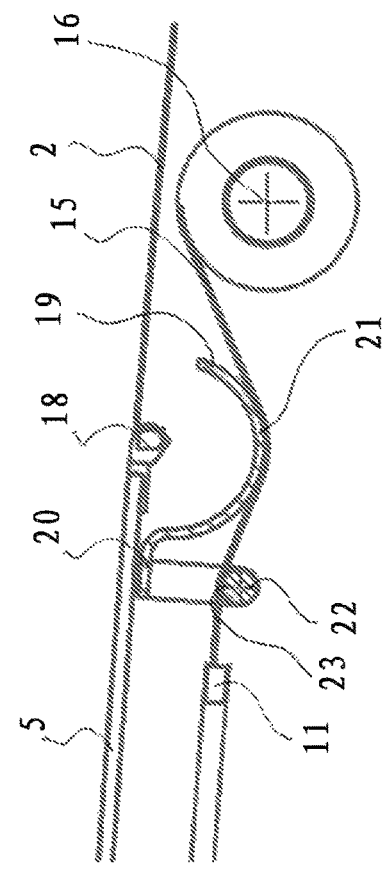

FIG. 6 shows how encapsulating material 24 is used to attach drain channel 19 to the lower side of panel 5.

Figure 7:
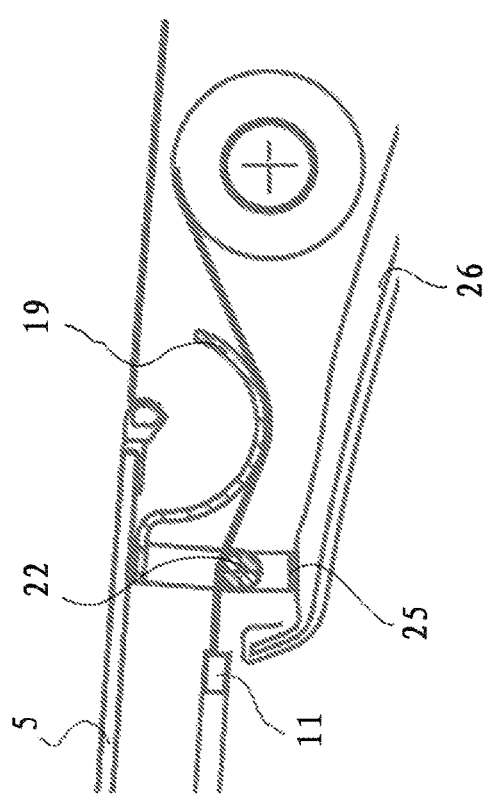

In the embodiment of FIG. 7, additional guide 22 is provided with a fixture 25 to attach a head liner 26 of the vehicle to drain channel 19. This is especially useful in case the roof system does not include a frame, or at least does not have such frame that can offer a point of attachment for headliner 26 there.

Figure 8:
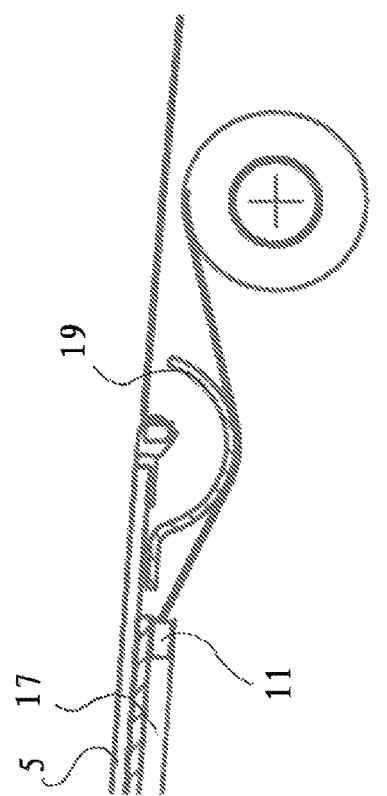

FIG. 8 shows an embodiment in which guide rails 17 are attached to the lower side of panel 5, so that no frame is needed for supporting guide rails 17. In this embodiment, additional guide 22 having second sliding surface 23 might be needed to bring rollo cloth at the desired height before the rollo cloth edges enter guide rails 17.

Figure 9:
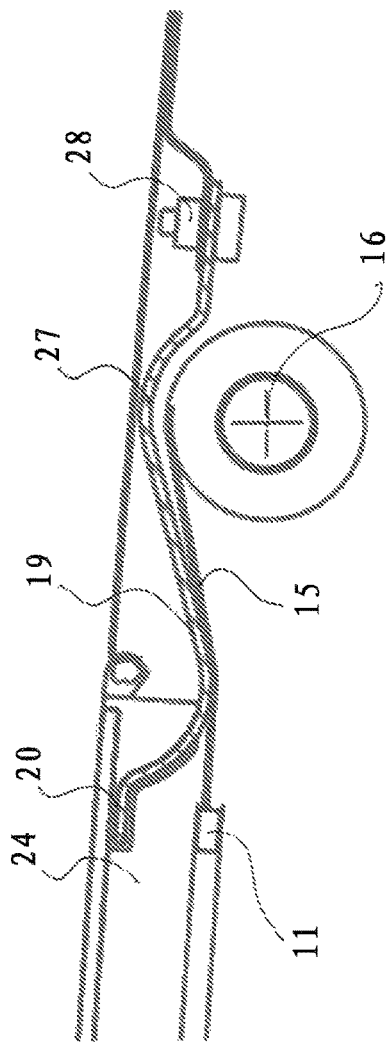

FIG. 9 shows a further embodiment which is comparable to that of FIG. 5 in that a rearward extension 27 of drain channel 19 is used to cover and in this case also support winding shaft 16. In this new embodiment, drain channel 19 is provided with a point of attachment 28 to fix drain channel 19 to fixed roof 2, so that drain channel 19 is better supported and less tension is present on the attachment of drain channel 19 to panel 5.

Figure 10:
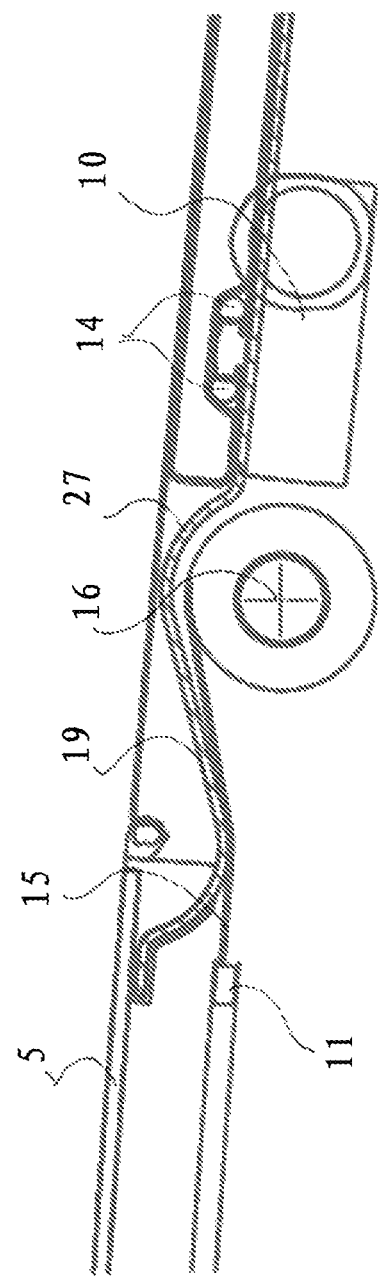

FIG. 10 shows an embodiment which is a further development of that of FIG. 9. Rearward extension 27 is now used to also support other parts of the roof system, here second electric motor 10 driving drive cables 14 to drive rollo beam 11 of rollo system 12. A long rear part of extension 27 is used to fix drain channel 19 to fixed roof 2.

Depending on the vehicle type and therefore the cross-sectional shape of panel 5 (which is adapted to that of fixed roof 2), winding shaft 16 can be straight if the cross-sectional shape of panel 5 is only slightly curved. Drain channel can then be either straight or curved similar to panel 5. If the curve of panel 5 is more pronounced, winding shaft 16 will generally be curved as well, so will be drain channel 19. Drain channel will normally be shaped such that water will flow to the opposite ends of drain channel 19 where it will drain the water to another part of the drainage system. The ends of drain channel 19 can be provided with a steeper lip or with an end piece having a sprout to direct water into another drain system part.

The invention is not limited to the embodiments described before and shown in the drawings which may be varied widely within the scope of the invention as defined by the appended claims. For example, the drain channel could be positioned at another edge of the panel, such as the front edge. In that case, it is easier to combine the drain channel with a movable panel. Although it is preferred to attach the drain channel to the panel, it could also be attached (additionally) to another part, such as to the frame of the roof system. In principle, it would be possible to combine features of the various embodiments shown and described.

What is claimed is:

1. A roof system for a vehicle having a roof opening in its fixed roof, comprising:
    a stationary part configured to be attached to the fixed roof;
    guide rails extending in longitudinal direction substantially parallel to opposite sides of the roof opening;
    an at least semi-transparent panel having edges, being supported on the stationary part, and being configured to close the roof opening at least partly, the panel having a drain channel connected therewith for draining any water seeping past at least one edge of the panel;
    a rollo assembly including a rollo cloth having a first edge with which the rollo cloth is connected to a winding shaft, and a second opposite edge to which a rollo beam is connected and opposite lateral edges guided in the guide rails, the rollo cloth being capable of being wound up onto the winding shaft and wound off from the winding shaft to uncover or cover the panel at least partly from below,
    wherein at least a part of the drain channel extends transversely within a path of the rollo cloth and comprises a first sliding surface in contact with the rollo cloth to guide the rollo cloth when the rollo cloth is wound up or off.

2. The roof system according to claim 1, wherein the drain channel has an upwardly directed upper side for collecting water and a downwardly directed lower side on a side opposite the upper side, wherein the downwardly directed lower side forms the first sliding surface.

3. The roof system according to claim 1, wherein a bottom part of the drain channel extends within the path of the rollo cloth and forms the first sliding surface.

4. The roof system according to claim 1, wherein the panel is fixed and is positioned within the roof opening.

5. The roof system according to claim 4, wherein the drain channel is fixed to a lower side of the panel.

6. The roof system according to claim 1, wherein the drain channel guides the rollo cloth from above, and the drain channel or panel is provided with a second sliding surface which guides the rollo cloth from below at a position further away from the winding shaft than the first sliding surface.

7. The roof system according to claim 1, wherein the drain channel is provided with an extension which serves at least as a cover for the winding shaft of the rollo cloth.

8. The roof system according to claim 7, wherein the drain channel and the extension are made from plastic.

9. The roof system according to claim 7, wherein the extension of the drain channel serves as a support for the winding shaft and is configured for attachment to the fixed roof of the vehicle.

10. The roof system according to claim 9, wherein the extension supports a drive motor and drive cables for the rollo beam.

11. The roof system according to claim 1, wherein the guide rails are attached to the stationary part of the roof system.

12. The roof system according to claim 4, wherein the guide rails are attached to the panel.

13. The roof system according to claim 4, wherein the panel is provided with a fixture configured to support a part of a headliner of the vehicle.

14. The roof system according to claim 5, wherein the drain channel is fixed to the panel by glue.

15. The roof system according to claim 5, wherein the drain channel is fixed to the panel by encapsulation material.

* * * * *